United States Patent
Fukase et al.

(10) Patent No.: US 8,409,735 B2
(45) Date of Patent: Apr. 2, 2013

(54) MICROBIAL POWER GENERATION METHOD AND MICROBIAL POWER GENERATION DEVICE

(75) Inventors: Tetsuro Fukase, Tokyo (JP); Nobuhiro Orita, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 202 days.

(21) Appl. No.: 12/998,423

(22) PCT Filed: Oct. 9, 2009

(86) PCT No.: PCT/JP2009/067635
§ 371 (c)(1),
(2), (4) Date: Apr. 19, 2011

(87) PCT Pub. No.: WO2010/050354
PCT Pub. Date: May 6, 2010

(65) Prior Publication Data
US 2011/0200847 A1 Aug. 18, 2011

(30) Foreign Application Priority Data
Oct. 30, 2008 (JP) ................. 2008-280104

(51) Int. Cl.
H01M 8/16 (2006.01)
H01M 8/04 (2006.01)

(52) U.S. Cl. .............. 429/2; 429/512; 429/513

(58) Field of Classification Search .............. 429/2, 512, 429/513
See application file for complete search history.

(56) References Cited

FOREIGN PATENT DOCUMENTS

| JP | 2000-133326 | 5/2000 |
|----|-------------|--------|
| JP | 2004-312412 | 12/2004 |
| JP | 2006-331706 | 12/2006 |
| JP | 2007-027019 | 2/2007 |
| JP | 2007-117995 | 5/2007 |
| JP | 2009-152097 | 7/2009 |
| JP | 2009-231231 | 10/2009 |

*Primary Examiner* — Helen O Conley
(74) *Attorney, Agent, or Firm* — Manabu Kanesaka

(57) ABSTRACT

Power generation efficiency of a microbial power generation device is improved by a simple and inexpensive means. Two plate-shaped cation-exchange membranes 31 are disposed parallel to each other in a tank body 30, whereby a negative electrode chamber 32 is formed between the cation-exchange membranes 31. Two positive electrode chambers 33 are each formed so as to be separated from the negative electrode chamber 32 by the corresponding cation-exchange membrane 31. An oxygen-containing gas is passed through the positive electrode chamber 33, a negative electrode solution L is supplied to the negative electrode chamber, and preferably the negative electrode solution is circulated. An acid gas (carbon dioxide gas) is introduced into the oxygen-containing gas to be supplied to the positive electrode chamber 33. Movement of $Na^+$ and $K^+$ ions is promoted by the pH neutralization effect produced by the acid gas, and thereby power generation efficiency can be improved.

13 Claims, 2 Drawing Sheets

MICROBIAL POWER GENERATION METHOD AND MICROBIAL POWER GENERATION DEVICE

RELATED APPLICATIONS

The present application is National Phase of International Application No. PCT/JP2009/067635 filed Oct. 9, 2009, and claims priority from Japanese Application No. 2008-280104, filed Oct. 30, 2008, the disclosure of which is hereby incorporated by reference herein in its entirety.

FIELD OF INVENTION

The present invention relates to a power generation method and device using microbial metabolic reactions. More particularly, the present invention relates to a microbial power generation method in which the reducing power obtained when organic substances are subjected to oxidative decomposition by microbes is taken out as electrical energy, and a device therefor.

BACKGROUND OF INVENTION

In recent years, there has been an increased need for a power generation method that takes the global environment into consideration, and technical development on microbial power generation has been in progress. Microbial power generation is a method of generating power by taking out electrical energy obtained when microbes assimilate organic substances.

Generally, in microbial power generation, microbes, organic substances to be assimilated by the microbes, and an electron transport medium (electron mediator) are made to coexist in a negative electrode chamber in which a negative electrode is disposed. The electron mediator enters the bodies of microbes, receives electrons which are generated when the microbes oxidize the organic substances, and passes the electrons to the negative electrode. The negative electrode is electrically connected through an external resistor (load) to a positive electrode. The electrons passed to the negative electrode move through the external resistor (load) to the positive electrode, and are passed to an electron acceptor in contact with the positive electrode. As a result of the movement of electrons, a current flows between the positive electrode and the negative electrode.

In microbial power generation, since the electron mediator takes electrons directly from the bodies of microbes, the theoretical energy conversion efficiency is high. However, the actual energy conversion efficiency is low, and improvement in power generation efficiency is required. Under these circumstances, in order to improve power generation efficiency, various studies and developments are under way regarding the material and structure of electrodes, the type of electron mediator, the selection of the microbial species, and the like (for example, Patent Literature 1 and Patent Literature 2).

Patent Literature 1 describes that a positive electrode chamber and a negative electrode chamber are separated by an alkali ion conductor composed of a solid electrolyte, each of the inside of the positive electrode chamber and the inside of the negative electrode chamber is kept at pH7 using a phosphate buffer (buffer), and by blowing air into the phosphate buffer (cathode solution) in the positive electrode chamber, power generation is performed.

Patent Literature 2 describes that a porous body is placed as a positive electrode plate so as to be in contact with an electrolyte membrane separating a positive electrode chamber from a negative electrode chamber, air is passed through the positive electrode chamber, and air and a solution is brought into contact with each other in the voids of the porous body. (Hereinafter, a positive electrode in which air is passed through a positive electrode chamber and oxygen in air is used as an electron acceptor in such a manner may be referred to as an "air cathode" in some cases).

In a microbial power generation device using an air cathode, a cathode solution is not required. Furthermore, air is simply passed through the positive electrode chamber, and aeration into the cathode solution is not required, which is advantageous.

Conventionally, in order to improve power generation efficiency in a microbial power generation device using an air cathode, studies have been conducted on
1) the mediator in the negative electrode (for example, Patent Literature 3),
2) pH adjustment in the negative electrode chamber,
3) the type of positive electrode catalyst and the catalytically active component support method,
4) the shape of the positive electrode, and the like.

Patent Literature 1: Japanese Unexamined Patent Application Publication No. 2000-133326
Patent Literature 2: Japanese Unexamined Patent Application Publication No. 2004-342412
Patent Literature 3: Japanese Unexamined Patent Application Publication No. 2006-331706

In a conventional microbial power generation device, power generation efficiency is small at 50 to 150 W/m$^3$ (per m$^3$ of negative electrode), and further improvement in power generation efficiency is desired.

SUMMARY OF INVENTION

It is an object of the present invention to provide a microbial power generation method capable of improving power generation efficiency of a microbial power generation device using a simple and inexpensive means, and to provide a microbial power generation device.

A microbial power generation method according to a first embodiment includes generating power by supplying an oxygen-containing gas to a positive electrode chamber of a microbial power generation device, the microbial power generation device including a negative electrode chamber having a negative electrode and holding a solution containing microbes and an electron donor, and the positive electrode chamber separated from the negative electrode chamber by an ion-permeable non-conductive membrane and having a positive electrode in contact with the ion-permeable non-conductive membrane, the method being characterized in that an acid gas is introduced into the oxygen-containing gas to be supplied to the positive electrode chamber.

A microbial power generation method according to a second embodiment is characterized in that, in the first embodiment, the acid gas is carbon dioxide gas.

A microbial power generation method according to a third embodiment is characterized in that, in the first or second embodiment, the ion-permeable non-conductive membrane is a cation-permeable membrane.

A microbial power generation method according to a fourth embodiment is characterized in that, in the second or third embodiment, the oxygen-containing gas is air, and carbon dioxide gas is introduced into air at a flow ratio of air to carbon dioxide gas of 100:0.1 to 100.

A microbial power generation method according to a fifth embodiment is characterized in that, in the second or third embodiment, the oxygen-containing gas is pure oxygen, and carbon dioxide gas is introduced into pure oxygen at a flow ratio of pure oxygen to carbon dioxide gas of 100:0.1 to 400.

A microbial power generation device according to a sixth embodiment includes a negative electrode chamber having a negative electrode and holding a solution containing microbes and an electron donor, a positive electrode chamber separated from the negative electrode chamber by an ion-permeable non-conductive membrane and having a positive electrode in contact with the ion-permeable non-conductive membrane, and a means for supplying an oxygen-containing gas to the positive electrode chamber, the microbial power generation device being characterized in that a means for introducing an acid gas into the oxygen-containing gas to be supplied to the positive electrode chamber is provided.

A microbial power generation device according to a seventh embodiment is characterized in that, in the sixth embodiment, the acid gas is carbon dioxide gas.

A microbial power generation device according to an eighth embodiment is characterized in that, in the sixth or seventh embodiment, the ion-permeable non-conductive membrane is a cation-permeable membrane.

A microbial power generation device according to a ninth embodiment is characterized in that, in the seventh or eighth embodiment, the oxygen-containing gas is air, and carbon dioxide gas is introduced into air at a flow ratio of air to carbon dioxide gas of 100:0.1 to 100.

A microbial power generation device according to a tenth embodiment is characterized in that, in the seventh or eighth embodiment, the oxygen-containing gas is pure oxygen, and carbon dioxide gas is introduced into pure oxygen at a flow ratio of pure oxygen to carbon dioxide gas of 100:0.1 to 400.

In the present invention, by using a simple and inexpensive means in which an acid gas is introduced into an oxygen-containing gas to be supplied to a positive electrode chamber, movement of $Na^+$ and $K^+$ ions is promoted by the pH neutralization effect produced by the acid gas on the ion-permeable non-conductive membrane, and thereby power generation efficiency can be improved.

In the present invention, it is preferable to use carbon dioxide gas as the acid gas in view of inexpensiveness and high safety and because it does not cause problems such as corrosion.

Furthermore, the ion-permeable non-conductive membrane is not particularly limited, and it is possible to obtain the effect due to introduction of an acid gas into an oxygen-containing gas in any ion-permeable non-conductive membrane. It is particularly effective when the ion-permeable non-conductive membrane is a cation-permeable membrane.

The introduction amount of the acid gas into the oxygen-containing gas is appropriately determined depending on the types of oxygen-containing gas and acid gas. When air is used as the oxygen-containing gas and carbon dioxide gas is used as the acid gas, preferably, the flow ratio of air to carbon dioxide gas of 100:0.1 to 100 (Claims 4 and 9). When pure oxygen is used as the oxygen-containing gas and carbon dioxide gas is used as the acid gas, preferably, the flow ratio of pure oxygen to carbon dioxide gas is 100:0.1 to 400.

DETAILED DESCRIPTION OF EMBODIMENTS

Embodiments of a microbial power generation method and a microbial power generation device according to the present invention will be described in detail below with reference to the drawings.

Figure 2:
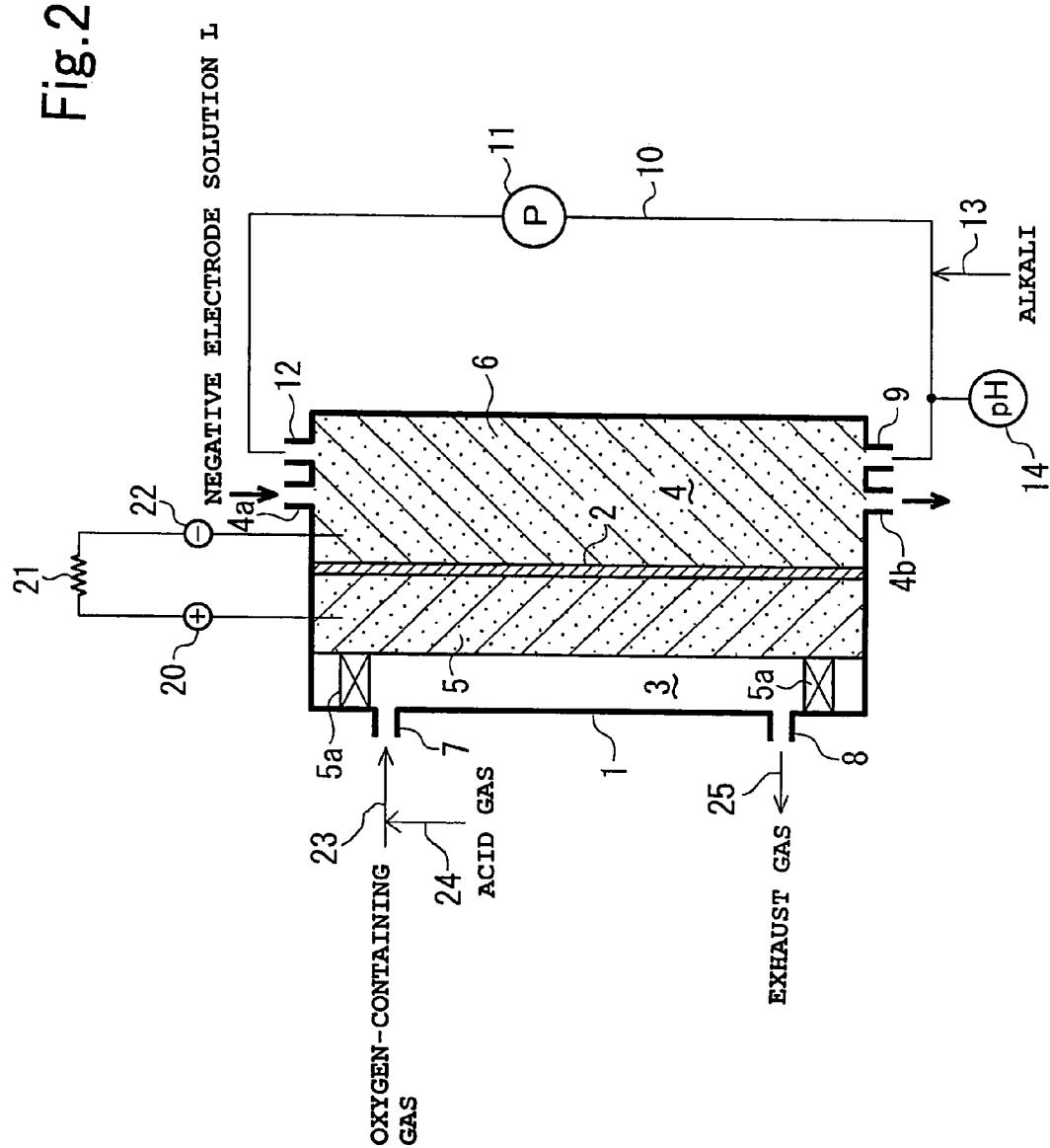
FIG. 2 is a schematic cross-sectional view of a microbial power generation device according to another embodiment of the present invention.

FIG. 2 is a schematic cross-sectional view showing a microbial power generation method according to the present invention and a general structure of a device.

A tank body 1 is divided into a positive electrode chamber 3 and a negative electrode chamber 4 by an ion-permeable non-conductive membrane 2. In the positive electrode chamber 3, a positive electrode 5 is disposed so as to be in contact with the ion-permeable non-conductive membrane 2.

In the negative electrode chamber 4, a negative electrode 6 composed of a conductive porous material is disposed. The negative electrode 6 is in contact with the ion-permeable non-conductive membrane 2 directly or with about one to two layers of microbial film therebetween. When the ion-permeable non-conductive membrane 2 is a cation-permeable membrane, protons ($H^+$) can be delivered to the ion-permeable non-conductive membrane 2 from the negative electrode 6.

The positive electrode chamber 3 is empty, an oxygen-containing gas such as air is introduced thereinto from a gas inlet 7, and an exhaust gas is discharged from a gas outlet 8 through an exhaust line 25. An acid gas introducing line 24 is connected to a supply line 23 that supplies an oxygen-containing gas to the positive electrode chamber 3, and an oxygen-containing gas which contains an acid gas is supplied to the positive electrode chamber 3.

As the ion-permeable non-conductive membrane 2 that separates the positive electrode chamber 3 from the negative electrode chamber 4, as will be described later, a cation-permeable membrane is suitable. However, other membranes may be used.

Microbes are supported on the negative electrode 6 composed of a porous material. A negative electrode solution L is introduced into the negative electrode chamber 4 from an inlet 4a, and a waste liquid is discharged from an outlet 4b. In addition, the negative electrode chamber 4 is kept anaerobic.

The negative electrode solution L inside the negative electrode chamber 4 is circulated through a circulation outlet port 9, a circulation line 10, a pump 11 for circulation, and a circulation return port 12. The circulation line 10 is provided with a pH meter 14 that measures the pH of the liquid discharged from the negative electrode chamber 4. A line 13 for adding an alkali, such as an aqueous sodium hydroxide solution, is also connected to the circulation line 10, and as necessary, an alkali is added so that the pH of the negative electrode solution L is 7 to 9.

Condensate water generated in the positive electrode chamber 3 is discharged from a condensate water outlet, which is not shown.

Because of the electromotive force produced between the positive electrode 5 and the negative electrode 6, a current flows through an external resistor 21 via terminals 20 and 22.

By passing an oxygen-containing gas which contains an acid gas through the positive electrode chamber 3 and, as necessary, by activating the pump 11 to circulate the negative electrode solution L, the following reaction proceeds in the negative electrode chamber 4:

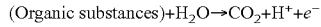

(Organic substances)+$H_2O \rightarrow CO_2 + H^+ + e^-$

The electrons $e^-$ flow through the negative electrode 6, the terminal 22, the external resistor 21, and the terminal 20 to the positive electrode 5.

The protons H⁺ generated in the reaction described above move through a cation-permeable membrane, i.e., the ion-permeable non-conductive membrane 2, to the positive electrode 5. In the positive electrode 5, the following reaction proceeds:

$$O_2 + 4H^+ + 4e^- \rightarrow 2H_2O$$

$H_2O$ generated in the positive electrode reaction is condensed to condensate water. $K^+$, $Na^+$, and the like which have passed through the cation-permeable membrane, i.e., the ion-permeable non-conductive membrane 2, are dissolved in the condensate water. As a result, in a conventional microbial power generation device into which only an oxygen-containing gas is made to flow, the condensate water becomes a strong alkali with a pH of about 9.5 to 12.5. In contrast, in the present invention, since an oxygen-containing gas added with an acid gas is made to flow, because of the neutralization effect produced by the acid gas, the pH of the condensate water becomes about 7.5 to 9.

That is, when a cation-permeable membrane is for example used as the ion-permeable non-conductive membrane 2, electrons generated in the negative electrode 6 flow through the terminal 22, the external resistor 21, and the terminal 20 to the positive electrode 5. Meanwhile, together with protons, $Na^+$ and $K^+$ in the negative electrode solution L introduced to the negative electrode 6 pass through the cation-permeable membrane, i.e., the ion-permeable non-conductive membrane 2, and move to the positive electrode chamber 3. In this case, it is assumed that movement of $Na^+$ and $K^+$ is promoted by the pH neutralization effect produced by the fact that the oxygen-containing gas to be supplied to the positive electrode chamber 3 contains the acid gas, and thereby power generation efficiency can be improved.

In the negative electrode chamber 4, the water decomposition reaction by microbes produces $CO_2$, and the pH tends to decrease. Therefore, an alkali is added to the negative electrode solution L so that the pH detected by the pH meter 14 is preferably 7 to 9. The alkali may be directly added to the negative electrode chamber 6. However, by adding the alkali to the circulating water, it is possible to maintain the pH to 7 to 9 over the entire region in the negative electrode chamber 6 without variation.

Figure 1:
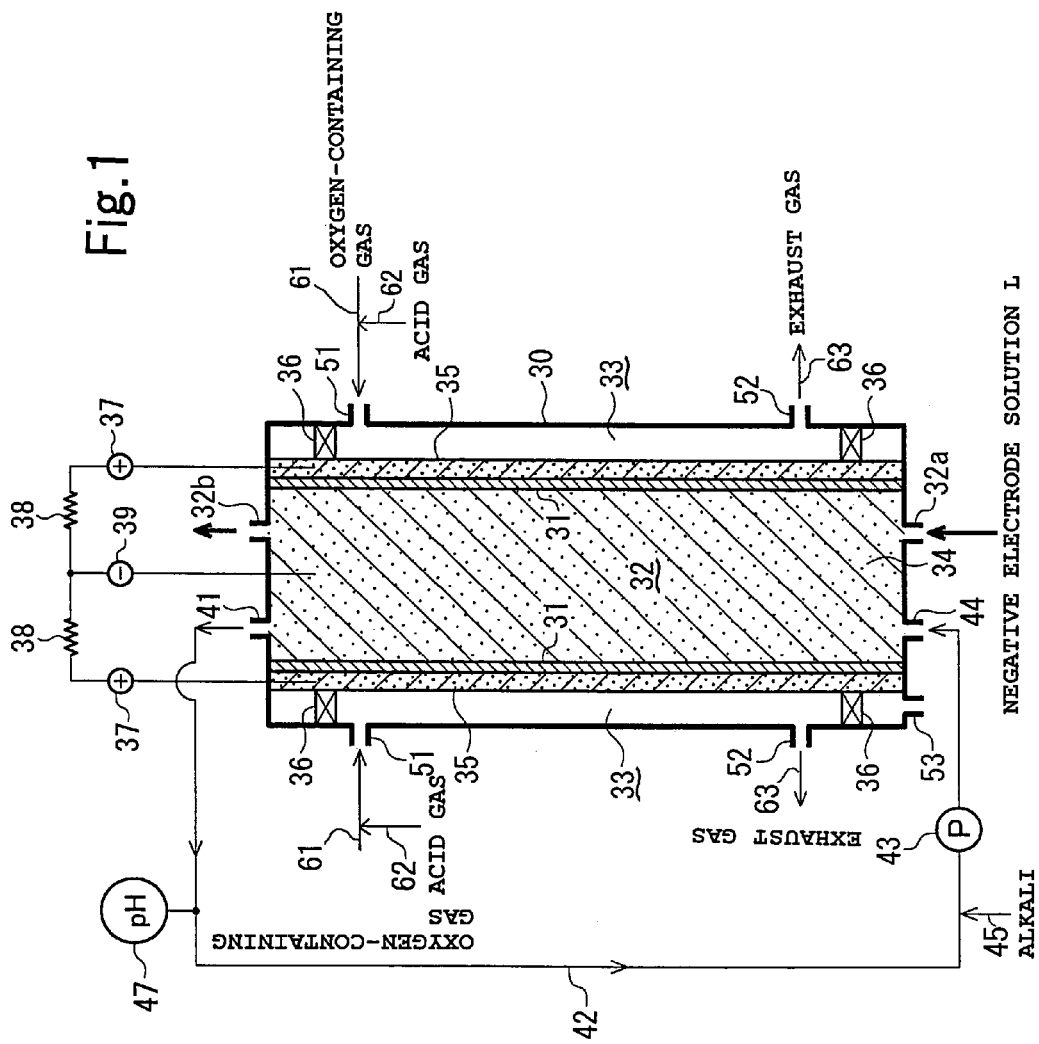
FIG. 1 is a schematic cross-sectional view of a microbial power generation device according to an embodiment of the present invention.

FIG. 1 is a schematic cross-sectional view showing a microbial power generation device according to a particularly preferred embodiment of the present invention.

Two plate-shaped ion-permeable non-conductive membranes 31 are disposed parallel to each other in a substantially rectangular parallelepiped-shaped tank body 30, whereby a negative electrode chamber 32 is formed between the ion-permeable non-conductive membranes 31. Two positive electrode chambers 33 are each formed so as to be separated from the negative electrode chamber 32 by the corresponding ion-permeable non-conductive membrane 31.

In the negative electrode chamber 32, a negative electrode 34 composed of a porous material is disposed so as to be in contact with each of the ion-permeable non-conductive membranes 31 directly or with about one to two layers of biofilm therebetween. Preferably, the negative electrode 34 is lightly pressed against the ion-permeable non-conductive membranes 31 (for example, at a pressure of 0.1 kg/cm² or less).

In the positive electrode chamber 33, a positive electrode 35 is disposed in contact with the ion-permeable non-conductive membrane 31. The positive electrode 35 is pressed against the ion-permeable non-conductive membrane 31 by packing 36. In order to enhance adhesion between the positive electrode 35 and the ion-permeable non-conductive membrane 31, these two members may be joined to each other by welding or bonded to each other by an adhesive.

An oxygen-containing gas added with an acid gas flows through a space between the positive electrode 35 and the sidewall of the tank body 30.

The positive electrode 35 and the negative electrode 34 are connected to an external resistor 38 respectively through terminals 37 and 39.

A negative electrode solution L is introduced into the negative electrode chamber 32 from an inlet 32a, and a waste liquid is discharged from an outlet 32b. The negative electrode chamber 32 is kept anaerobic.

The negative electrode solution inside the negative electrode chamber 32 is circulated through a circulation outlet port 41, a circulation line 42, a pump 43 for circulation, and a circulation return port 44. An oxygen-containing gas from a line 61 together with an acid gas from a line 62 flows in each positive electrode chamber 33 from a gas inlet 51, and an exhaust gas is discharged from a gas outlet 52 through a line 63.

The circulation line 42 for the negative electrode solution is provided with a pH meter 47, and a line 45 for adding an alkali is also connected to the circulation line 42. The pH of the negative electrode solution discharged from the negative electrode chamber 32 is detected by the pH meter 47, and an alkali, such as an aqueous sodium hydroxide solution, is added so that the pH is preferably 7 to 9.

In the microbial power generation device shown in FIG. 1, by passing an oxygen-containing gas added with an acid gas through the positive electrode chamber 33 and by passing the negative electrode solution through the negative electrode chamber 32, preferably, by circulating the negative electrode solution, a potential difference is generated between the positive electrode 35 and the negative electrode 34, and a current flows through the external resistor 38.

Next, description will be made on suitable materials and the like for microbes, the negative electrode solution and others, the oxygen-containing gas, the acid gas, the ion-permeable non-conductive membrane, the negative electrode, and the positive electrode in the microbial power generation device.

Microbes which produce electrical energy by being added to the negative electrode solution L are not particularly limited as long as they function as electron donors. Examples thereof include bacteria belonging to the genera *Saccharomyces, Hansenula, Candida, Micrococcus, Staphylococcus, Streptococcus, Leuconostoa, Lactobacillus, Corynebacterium, Arthrobacter, Bacillus, Clostridium, Neisseria, Escherichia, Enterobacter, Serratia, Achromobacter, Alcaligenes, Flavobacterium, Acetobacter, Moraxella, Nitrosomonas, Nitorobacter, Thiobacillus, Gluconobacter, Pseudomonas, Xanthomonas, Vibrio, Comamonas*, and *Proteus* (*Proteus vulgaris*), filamentous bacteria, and yeasts. As sludge containing such microbes, activated sludge obtained from a biological treatment tank which treats organic substance-containing water such as sewage, microbes contained in effluent from a primary sedimentation tank of sewage, anaerobic digested sludge, or the like is supplied as seeds to the negative electrode chamber, and thereby microbes can be held by the negative electrode. In order to increase power generation efficiency, preferably, the amount of microbes held in the negative electrode chamber has a high concentration, and for example, the microbial concentration is preferably 1 to 50 g/L.

As the negative electrode solution L, a solution that holds microbes or cells and has a composition required for power generation is used. For example, in the case where power generation is performed in the respiratory system, as the solution on the negative electrode side, a medium that has an energy source and a composition such as a nutrient required for performing metabolism in the respiratory system can be used. Examples thereof include bouillon medium, M9 medium, L medium, Malt Extract, MY medium, and nitrifying bacteria selective medium. Furthermore, organic waste, such as sewage, organic industrial effluent, or garbage, can be used.

An electron mediator may be added to the negative electrode solution L in order to facilitate extraction of electrons from microbes or cells. Examples of the electron mediator include compounds having a thionine skeleton such as thionine, dimethyl-disulfonated thionine, new methylene blue, and toluidine blue-O, compounds having a 2-hydroxy-1,4-naphthoquinone skeleton such as 2-hydroxy-1,4-naphthoquinone, brilliant cresyl blue, gallocyanine, resorufin, alizarine brilliant blue, phenothiazinone, phenazine ethosulfate, safranine-O, dichlorophenolindophenol, ferrocene, benzoquinone, phthalocyanine, benzylviologen, and derivatives of these compounds.

Furthermore, when a material that enhances the function of microbial power generation, for example, an antioxidant such as vitamin C, or a function-enhancing material which activates a specific electron transport system or substance transport system only, is dissolved, electric power can be obtained more efficiently, which is preferable.

The negative electrode solution L may contain a phosphate buffer as necessary.

The negative electrode solution L contains organic substances. The organic substances are not particularly limited as long as they are decomposed by microbes. For example, water-soluble organic substances, organic substance fine particles dispersed in water, or the like are used. The negative electrode solution may be organic wastewater, such as sewage or wastewater from food factories. In order to increase power generation efficiency, preferably, the organic substance concentration in the negative electrode solution L is high at about 100 to 10,000 mg/L.

As the oxygen-containing gas to be passed through the positive electrode chamber, air is suitable. However, pure oxygen or air enriched with oxygen can also be used.

The exhaust gas from the positive electrode chamber, after deoxidation treatment as necessary, may be passed through the negative electrode chamber and used for purging dissolved oxygen from the negative electrode solution L.

As the acid gas to be added to the oxygen-containing gas, a gas that shows acidity when formed into an aqueous solution, such as sulfurous acid gas, hydrogen chloride gas, or hydrogen sulfide gas, can be used without particular limitations. In particular, carbon dioxide gas is preferable because it is inexpensive and safe, does not cause a problem of corrosion, and it is useful for prevention of global warming. One type of acid gas may be used alone, or two or more types may be mixed for use.

The introduction amount of the acid gas into the oxygen-containing gas depends on the types of oxygen-containing gas and acid gas and the amount of the oxygen-containing gas to be passed. When carbon dioxide gas as the acid gas is introduced into air as the oxygen-containing gas, generally, carbon dioxide gas is used, on the flow ratio basis, in the amount of 0.1% to 100% relative to the amount of gas to be passed, preferably 0.1% to 20%. That is, the ratio of air to carbon dioxide gas is preferably 100:0.1 to 20. Even if the amount of carbon dioxide is larger than this range, no further effect of improving power generation activity is obtained, thus being uneconomical. On the other hand, if the amount of carbon dioxide gas is smaller than this range, the effect of improving power generation efficiency by introduction of carbon dioxide gas is small. In addition, within this range, power generation efficiency improves in proportion to the introduction amount of carbon dioxide gas. However, when the amount is further increased, power generation efficiency decreases inversely.

Furthermore, when pure oxygen is used as the oxygen-containing gas and carbon dioxide gas is used as the acid gas, carbon dioxide gas can be introduced in the amount about 400 times that of oxygen gas. For example, the flow ratio of pure oxygen to carbon dioxide gas is preferably 100:0.1 to 400. Even if the amount of carbon dioxide is larger than this range, no further effect of improving power generation activity is obtained, thus being uneconomical. On the other hand, if the amount of carbon dioxide gas is smaller than this range, the effect of improving power generation efficiency by introduction of carbon dioxide gas is small. In addition, within this range, power generation efficiency improves in proportion to the introduction amount of carbon dioxide gas. However, when the amount is further increased, power generation efficiency decreases inversely.

Regarding the method of introducing the acid gas into the oxygen-containing gas, a mixed gas obtained by mixing the oxygen-containing gas and the acid gas in advance may be supplied to the positive electrode chamber. Furthermore, the oxygen-containing gas and the acid gas may be made to flow simultaneously in the gas inlet of the positive electrode chamber. As shown in FIGS. 1 and 2, the acid gas may be introduced by connecting the acid gas introducing line to the oxygen-containing gas supply line.

As the ion-permeable non-conductive membrane, any ion-permeable membrane, such as a cation-permeable membrane or an anion-permeable membrane, which is non-conductive and has ion permeability, may be used. For example, various ion-exchange membranes, reverse osmosis membranes, and the like can be used. As the ion-exchange membrane, a cation-exchange membrane with high proton selectivity or an anion-exchange membrane can be used. For example, as the cation-exchange membrane, Nafion (registered trademark) manufactured by E.I. du Pont de Nemours and Company, a CMB membrane, which is a cation-exchange membrane manufactured by Astom Corporation, or the like can be used. Furthermore, as the anion-exchange membrane, Astom's anion-exchange membrane, Tokuyama's anion-type electrolyte membrane, or the like is suitable. The ion-permeable non-conductive membrane is preferably thin and strong, and usually, the thickness thereof is preferably 30 to 300 and particularly preferably about 30 to 200

As the ion-permeable non-conductive membrane, a cation-exchange membrane is particularly preferably used because the effect of introduction of the acid gas according to the present invention is effectively demonstrated.

The negative electrode is preferably a porous body which has a large surface area, many voids, and water permeability. Specific examples thereof include sheets composed of a conductive material, at least the surface of which is roughened, and porous conductors obtained by forming a conductive material into a porous sheet, such as felt (e.g., graphite felt, porous titanium, porous stainless steel, and the like).

In the case where such a porous negative electrode is made abut on the ion-permeable non-conductive membrane directly or with a microbial layer therebetween, electrons produced in the microbial reaction move to the negative electrode without using an electron mediator, and thus the electron mediator is not required.

A plurality of conductive sheets may be stacked to form a negative electrode. In this case, conductive sheets of the same type may be stacked, or conductive sheets of different types (for example, graphite felt and a graphite sheet having a rough surface) may be stacked.

The total thickness of the negative electrode is preferably 3 to 40 mm, and particularly preferably about 5 to 20 mm. When a negative electrode is composed of a laminated sheet, preferably, the stacking surfaces are oriented in a direction extending between the inlet and outlet of the solution such that the solution flows along the joining surfaces (stacking surfaces) of the sheets.

In the present invention, it may be possible to use a structure in which the negative electrode chamber is divided into a plurality of compartments, by connecting the compartments in series, a decrease in pH is suppressed in the individual compartments, and then the pH of the solution in the negative electrode chamber is adjusted. If the negative electrode chamber is divided, the amount of decomposition of organic substances in each compartment decreases, resulting in a decrease in the amount of production of carbon dioxide gas. Therefore, the decrease in pH in each compartment can be reduced.

Preferably, the positive electrode includes a conductive base material and an oxygen reduction catalyst supported on the conductive base material.

The conductive base material is not particularly limited as long as it has high conductivity, high corrosion resistance, sufficient conductivity and corrosion resistance even at a small thickness, and mechanical strength as the conductive base material. Examples thereof that can be used include graphite paper, graphite felt, graphite cloth, stainless steel mesh, titanium mesh, and the like. Among these, in view of durability, workability, and the like, graphite-based base materials, such as graphite paper, graphite felt, and graphite cloth, are preferable, and in particular, graphite paper is preferable. In addition, these graphite-based base materials may be hydrophobized with a fluororesin, such as polytetrafluoroethylene (PTFE).

If the thickness of the conductive base material of the positive electrode is too large, oxygen permeability is low. If the thickness is too small, it is not possible to satisfy required properties, such as strength necessary for the base material. Therefore, preferably, the thickness is about 20 to 3,000 µm.

As the oxygen reduction catalyst, besides a noble metal, such as platinum, a metal oxide, such as manganese dioxide, is suitable in view of inexpensiveness and good catalytic activity. The amount thereof to be supported is preferably about 0.01 to 2.0 mg/cm$^2$.

EXAMPLES

The present invention will be described more specifically below with reference to examples and comparative examples.

Comparative Example 1

A negative electrode chamber with a size of 7 cm×25 cm×2 cm (thickness) was filled with two sheets of graphite felt stacked together, each with a thickness of 1 cm, thereby forming a negative electrode. A positive electrode chamber was formed on the negative electrode with a cation-exchange membrane (trade name (registered trademark) "Nafion 115" manufactured by E.I. du Pont de Nemours and Company) as an ion-permeable non-conductive membrane therebetween. The positive electrode chamber had a size of 7 cm×25 cm×0.5 cm (thickness). A positive electrode was obtained by applying a liquid in which a Pt catalyst manufactured by Tanaka Kikinzoku Kogyo K.K. (Pt-supported carbon black, Pt content: 50% by weight) was dispersed in a 5% by weight Nafion (registered trademark) solution (manufactured by E.I. du Pont de Nemours and Company) to carbon paper (manufactured by Toyo Carbon Co., Ltd.) with a thickness of 160 µm, water-repellent finished with PTFE, such that the Pt coating weight was 0.4 mg/cm$^2$, followed by drying at 50° C. The positive electrode was brought into close contact with the cation-exchange membrane.

A stainless steel wire was bonded with a conductive paste to each of the graphite felt of the negative electrode and the carbon paper of the positive electrode to form a lead, and the two leads were connected to each other with a resistance of 2Ω.

A negative electrode solution containing 1,000 mg/L of acetic acid, phosphoric acid, and ammonia, in which the pH was maintained at 7.5, was passed though the negative electrode chamber. The negative electrode solution was heated to 35° C. in advance in another tank, and by passing the solution heated in the tank through the negative electrode chamber at 10 mL/min, the negative electrode chamber was heated to a temperature of 35° C. Prior to passing the negative electrode solution, effluent of another microbial power generation device was passed for the purpose of inoculation.

Air at room temperature was passed through the positive electrode chamber at a flow rate of 1.0 L/min.

As a result, in three days after the start of passing the negative electrode solution, the power output became substantially constant, and the power output per m$^3$ of negative electrode was 140 W (power generation efficiency: 140 W/m$^3$).

Example 1

Power generation was performed as in Comparative Example 1 except that 1 mL/min (0.1% relative to air) of carbon dioxide gas was introduced from a carbon dioxide gas cylinder into air to be supplied to the positive electrode chamber. As a result, power generation efficiency started improving immediately after introduction of carbon dioxide gas, and in five minutes, the power generation efficiency was 180 W/m$^3$.

Examples 2 to 7

Power generation was performed as in Example 1 except that the flow rate of carbon dioxide gas was changed as shown in Table 1. The power generation efficiency was checked, and the results are shown together with the results of Comparative Example 1 and Example 1 in Table 1.

TABLE 1

| Examples | Introduction amount of carbon dioxide gas into air (mL/min)* | Power generation efficiency (W/m$^3$) |
| --- | --- | --- |
| Comparative Example 1 | 0 | 140 |
| Example 1 | 1 (0.1) | 180 |
| Example 2 | 10 (1) | 205 |
| Example 3 | 50 (5) | 230 |
| Example 4 | 100 (10) | 252 |
| Example 5 | 200 (20) | 255 |
| Example 6 | 500 (50) | 255 |
| Example 7 | 1000 (100) | 248 |

*Flow ratio (%) relative to air is shown in parentheses.

Comparative Example 2, Examples 8 to 11

Power generation was performed as in Example 1 except that, instead of air, pure oxygen was used as the oxygen-containing gas, the flow rate to the positive electrode chamber was set at 50 mL/min, and carbon dioxide gas was introduced into the pure oxygen at the flow rate shown in Table 2 (however, pure oxygen only without introducing carbon dioxide gas in Comparative Example 2). The power generation efficiency was checked, and the results are shown in Table 2.

TABLE 2

| Examples | Introduction amount of carbon dioxide gas into pure oxygen (mL/min)* | Power generation efficiency (W/m$^3$) |
|---|---|---|
| Comparative Example 2 | 0 | 175 |
| Example 8 | 1 (2) | 240 |
| Example 9 | 10 (20) | 303 |
| Example 10 | 50 (100) | 330 |
| Example 11 | 100 (200) | 330 |

*Flow ratio (%) relative to pure oxygen is shown in parentheses.

Examples 12 to 15

Power generation was performed as in Example 2 except that, instead of carbon dioxide gas, sulfurous acid gas ($SO_2$) was used as the acid gas, and sulfurous acid gas was introduced into the pure oxygen at the flow rate shown in Table 3. The power generation efficiency was checked, and the results are shown together with the result, of Comparative Example 2 in Table 3.

TABLE 3

| Examples | Introduction amount of sulfurous acid gas into pure oxygen (mL/min)* | Power generation efficiency (W/m$^3$) |
|---|---|---|
| Comparative Example 2 | 0 | 175 |
| Example 12 | 10 (1) | 202 |
| Example 13 | 50 (100) | 232 |
| Example 14 | 100 (200) | 232 |
| Example 15 | 500 (1000) | 120 |

*Flow ratio (%) relative to pure oxygen is shown in parentheses.

As is evident from the above results, by introducing an acid gas into an oxygen-containing gas to be supplied to the positive electrode chamber, power generation efficiency can be improved.

While the present invention has been described in detail with reference to the specific embodiments, it is apparent to persons skilled in the art that the embodiments may be subjected to various modifications without departing from the spirit and scope of the present invention.

This application is based on Japanese Patent Application (Patent Application No. 2008-280104) filed on Oct. 30, 2008, which is hereby incorporated by reference herein in its entirety.

The invention claimed is:

1. A microbial power generation method comprising generating power by supplying an oxygen-containing gas to a positive electrode chamber of a microbial power generation device, the microbial power generation device including a negative electrode chamber having a negative electrode and holding a solution containing microbes and an electron donor, the positive electrode chamber separated from the negative electrode chamber by an ion-permeable non-conductive membrane and having a positive electrode in contact with the ion-permeable non-conductive membrane, and a means for supplying the oxygen-containing gas to the positive electrode chamber, wherein the method is characterized in that an acid gas is introduced into the oxygen-containing gas to be supplied to the positive electrode chamber.

2. The microbial power generation method according to claim 1, wherein the acid gas is carbon dioxide gas.

3. The microbial power generation method according to claim 1, wherein the ion-permeable non-conductive membrane is a cation-permeable membrane.

4. The microbial power generation method according to claim 2, wherein the oxygen-containing gas is air, and carbon dioxide gas is introduced into air at a flow ratio of air to carbon dioxide gas of 100:0.1 to 100.

5. The microbial power generation method according to claim 2, wherein the oxygen-containing gas is pure oxygen, and carbon dioxide gas is introduced into pure oxygen at a flow ratio of pure oxygen to carbon dioxide gas of 100:0.1 to 400.

6. A microbial power generation device comprising:
a negative electrode chamber having a negative electrode and holding a solution containing microbes and an electron donor;
a positive electrode chamber separated from the negative electrode chamber by an ion-permeable non-conductive membrane and having a positive electrode in contact with the ion-permeable non-conductive membrane; and
a means for supplying an oxygen-containing gas to the positive electrode chamber,
wherein the device is characterized in that an introduction means for introducing an acid gas into the oxygen-containing gas to be supplied to the positive electrode chamber is provided.

7. The microbial power generation device according to claim 6, wherein the acid gas is carbon dioxide gas.

8. The microbial power generation device according to claim 6, wherein the ion-permeable non-conductive membrane is a cation-permeable membrane.

9. The microbial power generation device according to claim 7, wherein the oxygen-containing gas is air, and the introduction means introduces carbon dioxide gas into air at a flow ratio of air to carbon dioxide gas of 100:0.1 to 100.

10. The microbial power generation device according to claim 7, wherein the oxygen-containing gas is pure oxygen, and the introduction means introduces carbon dioxide gas into pure oxygen at a flow ratio of pure oxygen to carbon dioxide gas of 100:0.1 to 400.

11. The microbial power generation device according to claim 6, wherein the positive electrode chamber is disposed on each of two sides of the negative electrode chamber.

12. The microbial power generation device according to claim 6, wherein the negative electrode is composed of a porous conductor.

13. The microbial power generation device according to claim 12, wherein the porous conductor is graphite felt.

* * * * *